(12) United States Patent
Haugland

(10) Patent No.: US 8,926,381 B2
(45) Date of Patent: Jan. 6, 2015

(54) HYBRID PROPULSION SYSTEM FOR A VESSEL

(75) Inventor: Torbjorn Haugland, Bergen (NO)

(73) Assignee: Rolls-Royce Marine AS, Bergen (NO)

( * ) Notice: Subject to any disclaimer, the term of this patent is extended or adjusted under 35 U.S.C. 154(b) by 0 days.

(21) Appl. No.: 13/508,802

(22) PCT Filed: Nov. 9, 2010

(86) PCT No.: PCT/NO2010/000405
§ 371 (c)(1),
(2), (4) Date: Jul. 30, 2012

(87) PCT Pub. No.: WO2011/056079
PCT Pub. Date: May 12, 2011

(65) Prior Publication Data
US 2012/0309242 A1 Dec. 6, 2012

(30) Foreign Application Priority Data

Nov. 9, 2009 (NO) .................................. 20093303

(51) Int. Cl.
*B63H 21/17* (2006.01)
*B63J 3/02* (2006.01)
*B63H 21/20* (2006.01)
*B63J 3/04* (2006.01)

(52) U.S. Cl.
CPC . *B63J 3/02* (2013.01); *B63H 21/20* (2013.01); *B63J 3/04* (2013.01); *Y02T 70/5236* (2013.01)
USPC .............................................................. 440/6

(58) Field of Classification Search
USPC .............................................................. 440/6
IPC ..................................................... B63H 23/24
See application file for complete search history.

(56) References Cited

U.S. PATENT DOCUMENTS

| 7,170,262 | B2 * | 1/2007 | Pettigrew ........................ 322/32 |
| 8,049,358 | B2 * | 11/2011 | Crane et al. .................... 307/9.1 |
| 8,244,419 | B2 * | 8/2012 | Wegner-Donnelly et al. .. 701/21 |
| 8,357,019 | B2 * | 1/2013 | Frizon et al. ...................... 440/6 |
| 2005/0184589 | A1 * | 8/2005 | Fujita ............................... 307/19 |
| 2008/0315583 | A1 | 12/2008 | Beck et al. |

FOREIGN PATENT DOCUMENTS

| DE | 10 2005 059 760 | 7/2007 |
| JP | 5-139381 | 6/1993 |
| WO | WO 2007/060189 | 5/2007 |

* cited by examiner

*Primary Examiner* — Stephen Avila
(74) *Attorney, Agent, or Firm* — Ladas & Parry LLP

(57) ABSTRACT

Hybrid propulsion system for a vessel including main engines connected to propulsion to propulsion means via transmission devices and connection devices for connection and disconnection, where the system includes one or more electrical machines arranged to the transmission device(s) via connection device for connection and disconnection of the from the transmission device, and one or more hybrid shaft generators, which is/are arranged between the electrical machine and one or more switchboards for the vessel.

34 Claims, 3 Drawing Sheets

HYBRID PROPULSION SYSTEM FOR A VESSEL

Figure 1:
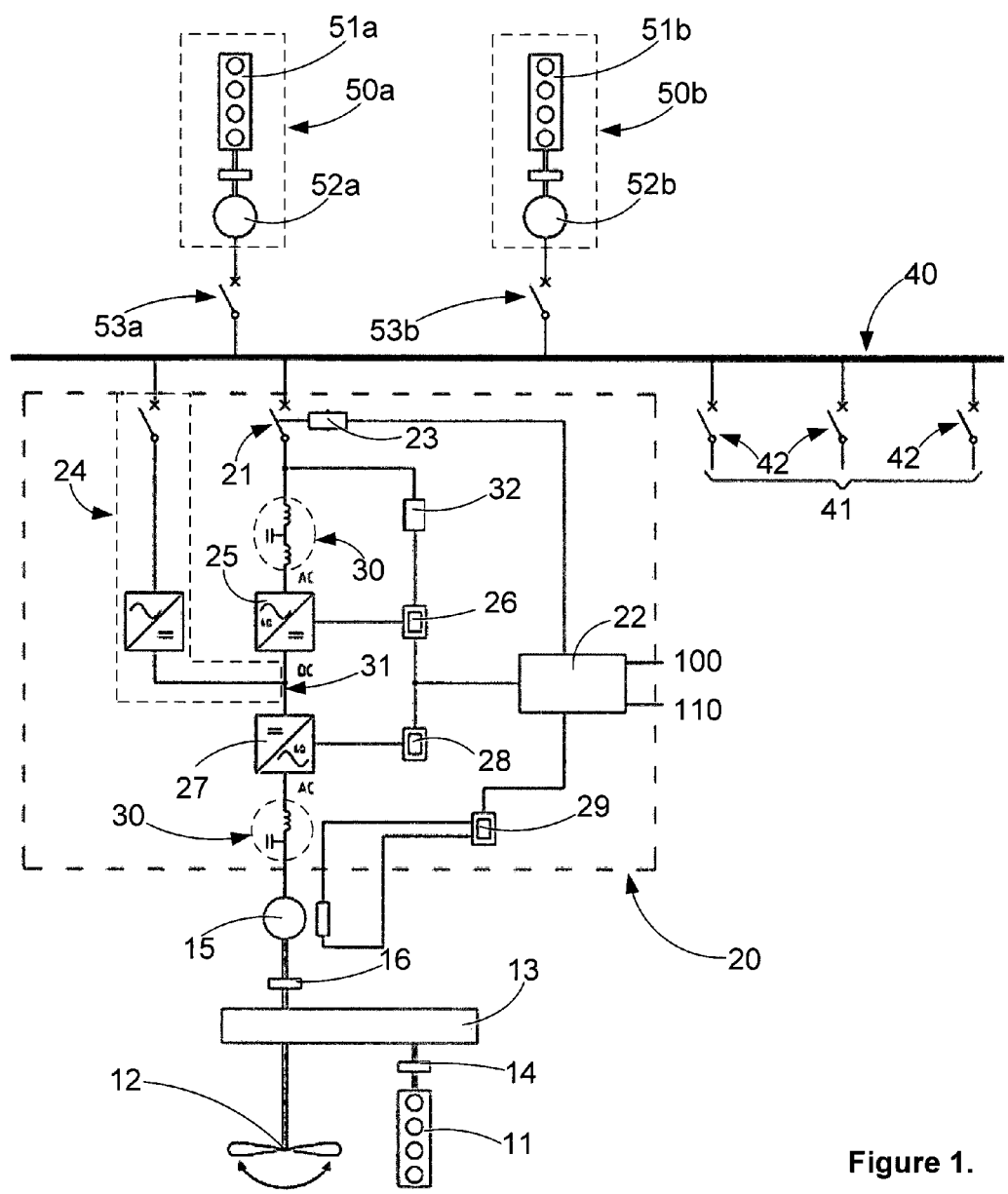

This application is a 371 of PCT/NO2010/000405, filed on Nov. 9, 2010, which claims priority to Norwegian patent application number 20093303, filed Nov. 9, 2009, which is incorporated herein by reference.

The present invention relates to a hybrid propulsion system for a vessel including a hybrid shaft generator drive, according to the preamble of claim 1.

BACKGROUND

In a world facing ever increasing environmental and financial challenges there exist a growing need for more fuel efficient sea going vessels. Many of these vessels are multipurpose, performing a wide variety of tasks. A flexible vessel configuration is required to maintain optimal energy efficiency regardless of operating mode.

Conventional diesel mechanical and diesel electric propulsion systems both have their advantages and disadvantages. Combining the best of both propulsion systems and making a hybrid propulsion system is already a reality. Hybrid propulsion systems are becoming increasingly popular when choosing propulsion systems for new vessels for saving fuel and reducing emission of $NO_x$, $CO_2$ and other hazardous emission.

Known solutions of hybrid propulsion systems are, among others, US2008315583A which describes a propulsion system for a vessel having a diesel engine, a propeller, at least one auxiliary generator set, a generator and a drive unit for at least one machine, where the diesel engine can be connected on the one hand to the propeller and on the other hand by means of the generator to a power supply system in the vessel, where the drive unit for the machines have at least one converter which can be connected on the one hand to the power supply system and on the other hand to the load side of the generator.

Another known solution is described in WO09067722A, which describes a system and a method for providing power to a marine vessel and, more particularly, to a tugboat. The system includes diesel engines and generators and batteries which can be charged using power supplied by the generators, shore power or regenerated power. The tugboat is operated utilizing battery power only and the generators are used to provide additional power if needed or to recharge the batteries.

From WO08113999A it is known a propulsion arrangement for a marine vessel. The propulsion arrangement comprises an engine for propelling the vessel and an electrical machine coupled to the engine. The electrical machine is arranged to supply onboard electrical power for the vessel. A control unit controls the electrical machine such that the electrical machine is selectively operable as a generator or a motor. The control unit and the electrical machine are arranged such that the electrical machine, when operating as a motor, can supplement the power of the engine while the engine is in operation. In one embodiment, the control unit and the electrical machine are arranged to provide active damping of the engine torque.

In WO08130968A is described a marine vessel power generation and propulsion system including a control system. The system includes a plurality of generator sets, each generator set including an engine configured to drive an electrical generator and wherein each generator set is configured to supply electrical power to an electrical bus. The system includes further a control system configured to switch the power generation system between a plurality of operating modes, wherein in each mode of operation the control system adjusts each generator set to dynamically optimize the performance of the power generation system. In each mode of operation the control system is configured to prioritize a different predetermined characteristic when optimizing the performance of the power generation system.

A hybrid propulsion configuration allows both electrical motors and diesel engines to be used independently or combined to obtain optimum efficiency regardless of operating mode.

The main challenge, when using a hybrid propulsion system, is controlling the power flow and load sharing between diesel engines, electric motors and generators. This is particularly challenging when the propeller load is fluctuating and all the propulsion system components are linked through various gearboxes. A frequency converter is one option for controlling the speed and power output of electrical motors operating in parallel with a diesel engine through the same gearbox.

A serious limitation of the hybrid propulsion system is the common use of shaft generators to produce network electrical power. A shaft generator is driven by the same diesel engine powering the main propeller via a common gearbox. The problem occurs when the load on the main propeller is fluctuating whilst the diesel engine tries to maintain a constant speed to allow proper load sharing and load flow with other generators. Also a constant diesel engine speed is necessary for the shaft generator to maintain a stable network frequency. The result is energy inefficiency when propeller in many cases could be running with slower speed.

Other disadvantages with existing systems are that the gearbox needs two outputs; one for the electrical motor and one for the generator.

Further, a change of mode between operation of electrical motor and generator operation will be complicated and take long time.

A problem to be addressed is also to maintain selectivity at short-circuit of switchboard, something one today is dependent of a rotating machine, such as a generator, to achieve.

OBJECT

The main object of the present invention is to provide a system which entirely or partly improves the disadvantages of prior art, and a system reducing the fuel consumption of vessels, and is simple to operate and less complicated than present solutions.

It is further an object of the present invention to provide a system which expands the flexibility which a hybrid propulsion system provides for a vessel, compared to prior art.

It is further an object of the present invention to provide a system which makes electrical power take in and power take out possible on the same electrical machine, which results in that one saves an additional shaft and clutch on the gearbox, compared to prior art solutions.

It is further an object of the present invention to provide a system which makes it possible running main motor with variable rotational speed, both in electrical power take in and electrical power take out modes.

It is further an object of the present invention to provide a system which makes parallel operation of the shaft generator and other generator sets or shaft generators possible.

It is further an object of the present invention to provide a system which is more flexible and more rapid can change mode in relation to existing solutions.

Finally it is an object of the present invention to provide a system where it is simple to implement additional functions, as shore power and energy storing.

THE INVENTION

A system according to the invention is described in claim 1. Preferable features and details of the system are described in the remaining claims.

A hybrid system for operation of a vessel according to the invention includes one or more main engines, usually in the form of diesel engines, for operating one or more propulsion means for the vessel, usually the main propeller of the vessel, which main engine(s) are connected to the propulsion mean(s) via one or more transmission devices, usually a gearbox, and that there is arranged a connection device between the transmission device and main motor for connecting and disconnecting the main motor. To the same transmission device is further arranged an asynchronous or synchronous AC machine (hereinafter referred to as electrical machine), connected via a connection device for connecting and disconnecting the electrical machine from the transmission device.

The system further includes one or more hybrid shaft generator drives, which is/are arranged between the electrical machine and one or more switchboards/grid. The system preferably includes one hybrid shaft generator drive for each main propeller of the vessel. To the switchboard/grid is further arranged one or more auxiliary generator sets, which auxiliary generator sets includes a motor configured to power an electrical generator, which auxiliary generator sets are arranged to the switchboard/grid via switches. The switchboard is further the unit which controls the supply to other consumer units onboard.

The hybrid shaft generator drive includes further a switch for connection to the switchboard/grid. The hybrid shaft generator drive further includes a control unit, such as a PLS, arranged to/provided with an interface to a control system for the propulsion means. The hybrid shaft generator drive further preferably includes a pre-charge circuit for pre-charging a DC-intermediate circuit, a static frequency converter, in the form of a bidirectional frequency converter with Active Front End control connected to the switchboard/grid and controlled by the Active Front End control, and a bidirectional frequency converter connected to the electrical machine and controlled by a machine control unit.

In connection with the Active Front End control it is arranged a circuit for reading voltage and phase angle for the switchboard, which will be described in detail below.

The hybrid shaft generator drive can also include a device for excitation control, arranged between the electrical machine and the control unit, especially in cases where it is used a brushless synchronous machine.

The system preferably further includes sinus filter(s) which is/are arranged between the frequency converter with Active Front End control and the switchboard/grid, and possibly between the electrical machine and its frequency converter.

The hybrid shaft generator drive is arranged for 4-quadrant operation of the electrical machine, which electrical machine can power the propulsion means with variable speed against the switchboard with a fixed voltage and frequency in parallel with the auxiliary generator set(s) or as an island unit, and power the propulsion means together with the auxiliary generator set(s) or together with the main motor(s).

The 4-quadrant operation of the electrical machine is achieved by arranging a static frequency converter, in the form of a frequency converter with Active Front End control, between the hybrid shaft generator drive and the switchboard/grid, which frequency converter has the same electrical characteristics as a generator set. Using a static frequency converter as a shaft generator will further optimize the hybrid solution as regards fuel efficiency.

There are several advantages with this solution:
- it makes 4-quadrant operations possible, which means that the same electrical machine can be used as both generator and motor,
- in motor mode the main motor and propulsion means can be operated with variable speed whilst the grid is stable and fixed,
- as shaft generator it can be operated in parallel with other auxiliary generator sets without load sharing problems, even if main motor and propulsion means are operated with variable speed,
- as motor it can operate alone or together with the main motor(s),
- full power control is achieved in all modes,
- it provides reduced complexity, as additional motor and clutch are unnecessary when operating in motor mode,
- it provides optimized system operation and a considerable potential for fuel savings, and
- it can be achieved a flexible propulsion system with fast and easy mode change between generating and motoring, and redundancy built in.

As mentioned the solution according to the invention gives possibilities for defining different control modes, which will be described below. The defined modes for the propulsion system are selectable for the operator of the vessel. The different modes will have different qualities and the reason for choosing a specific mode can vary, but criteria as fuel efficiency, safety and comfort, will be a guide for the mode selection.

The number of modes being available is usually defined by the system configuration and the usage of the vessel.

In a hybrid propulsion system according to the invention one will, for example, have the following basic modes available:

1. Electric power take in: The propulsion system is supplied with power from auxiliary generator sets and is power the propulsion means via the electrical machine via the transmission device, while the main motor is disconnected.

2. Hybrid power take in: The propulsion system is supplied with power from the auxiliary generator sets and is powering the propulsion means via the electrical machine via the transmission device. I.e. both the hybrid shaft generator drive and main motor are powering the propulsion means via the common transmission device.

3. Power take out to grid: The main motor is powering the propulsion means with varying speed depending on requested output power. The hybrid shaft generator drive is now using the electrical machine connected to the transmission device as a generator to supply energy to the switchboard/grid. The hybrid shaft generator drive is operating in parallel with the auxiliary generator sets.

4. Power take out as island unit: The main motor is powering the propulsion means with variable speed depending on requested power output. The hybrid shaft generator drive is now using the electrical machine connected to the transmission device as a generator and supplying power to the switchboard/grid. The hybrid shaft generator drive is here supplying fixed voltage and frequency to the switchboard/grid as an island unit without auxiliary generators in parallel.

If desired the system can further be arranged with the following modes:

5. Full hybrid operation: The hybrid shaft generator drive has power available from energy storage, and possibly auxiliary generator sets, and is operated as a full hybrid by using the modes 1 to 4, depending on bridge command.

6. Shore power mode: The hybrid shaft generator drive is supplied with power from a shore connection or energy storage, and supplies the switchboard as the vessel is lying at port.

7. Pure mechanical operation: The hybrid shaft generator drive is disconnected, while the main engine is powering the propulsion means, and energy storage or auxiliary generators is supplying the switchboard/grid with power. This mode can also be arranged in the propeller control system.

The use of a static frequency converter requires further than one takes into consideration short circuit current and motor starting capability, which can be implemented in the switchboard design, so that safe operation of the switchboard is achieved in all situations.

The entire vessel installation must be verified for start current and inrush current, including all installed electrical components. If some consumer units, motors, converters, etc. has start current/inrush current near the properties of the static frequency converter, special starters/pre-charge devices must be installed to reduce start current/inrush current. Alternatively, start inquiries are sent to the power management system which only allows the electrical machine to start when the correct conditions are available on the switchboard, even if this means waiting while another generator starts.

The static frequency converter is capable of providing continuous short circuit current at zero voltage with nominal voltage. This means that all protection on incoming feeders must be set/verified to provide instantaneous disconnection at the short circuit level of the static frequency converter to ensure safe disconnection at errors and full system restoration by the power management system.

Further details of the invention will appear from the following example description.

EXAMPLE

Figure 2:
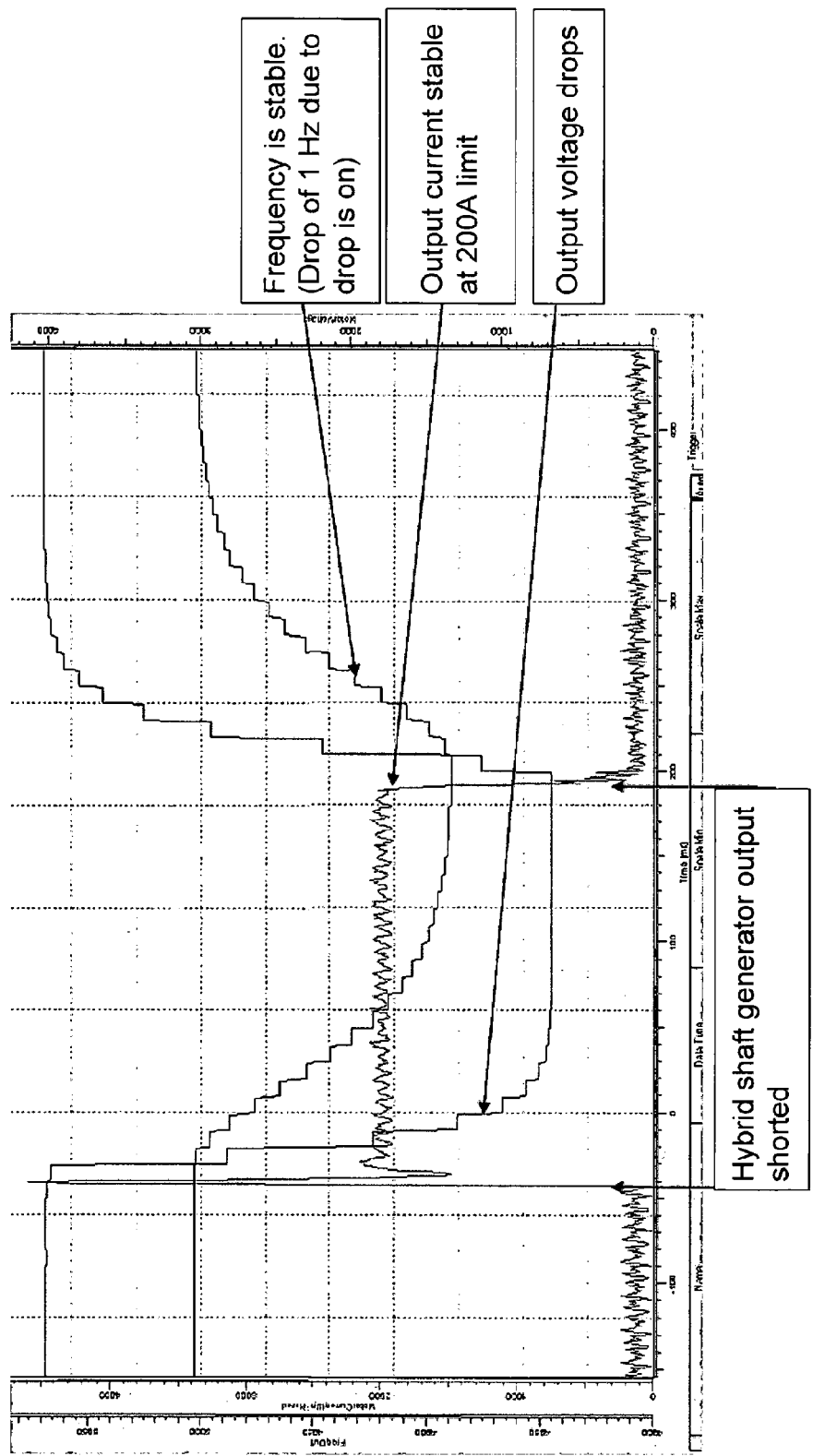
Figure 3:
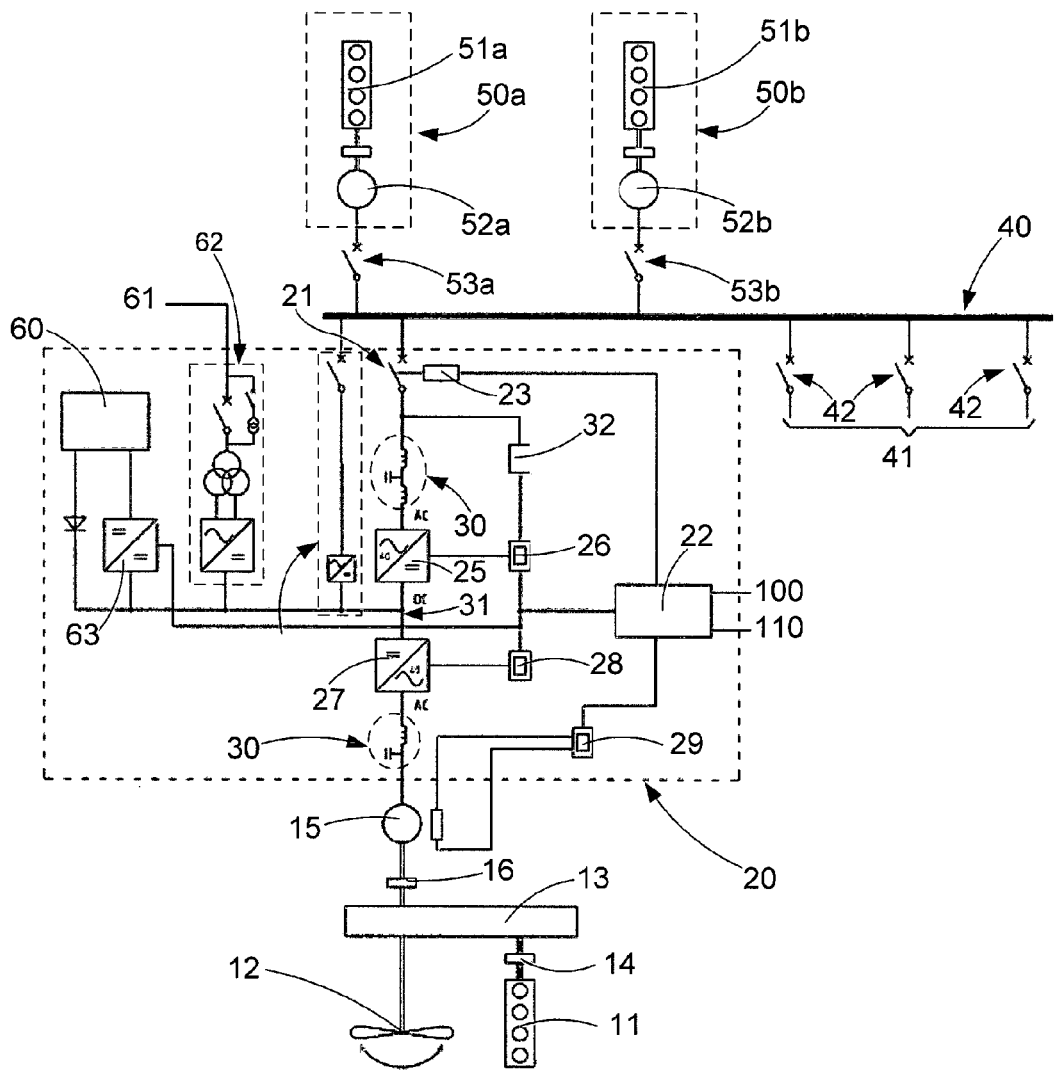

The invention will now be described in more detail with references to the attached drawings, where:

FIG. 1 is a principle drawing of a hybrid propulsion system according to a first embodiment of the invention, FIG. 2 shows a short circuit test, and FIG. 3 is a principle drawing of a hybrid propulsion system according to a second embodiment of the invention.

Reference is first made to FIG. 1 which shows a principle drawing of a hybrid propulsion system according to the invention. A system according to the invention includes a main engine 11, usually in the form of diesel engines, for running one or more propellers 12, preferably the main propeller of the vessel. The main engine 11 is connected to the main propeller 12 via a gearbox 13, and it is arranged a clutch 14 between the gearbox and the main engine 11 for disconnecting the main engine 11. To the gearbox 13 is further an asynchronous or synchronous AC-machine 15 connected via a clutch 16 for disconnection of the electrical machine 15 from the gearbox 13. The electrical machine 15 is preferably a permanent magnet motor, but also asynchronous motors or brushless synchronous motors can be used.

The system further includes a hybrid shaft generator drive 20 which is arranged between the machine 15 and a switchboard 40/grid. To the switchboard 40/grid is further arranged one or more auxiliary generator sets 50a-b, which auxiliary generator sets 50a-b includes a motor 51a-b configured to power an electrical generator 52a-b, which auxiliary generator sets 50a-b are arranged to the switchboard 40/grid via switches 53a-b. The switchboard 40 further controls the supply 41 to consumer units. The hybrid shaft generator drive 20 further includes a switch 21 for connection of the drive 20 to the switchboard 40, which switch 21 is controlled by a control unit 22 via a switch control 23. The control unit 22, such as a PLS, is arranged to/provided with an interface to a power management system 100 and an interface to a propeller control system 110. The control unit 22 is further provided with algorithms/software and/or means for controlling the system, further described below. The drive 20 further includes a pre-charge circuit 24 for pre-charging a DC-intermediate circuit 31, and a bidirectional AC/DC converter 25 with Active Front End control 26, and a bidirectional DC/AC converter 27 connected to the machine 15, which DC/AC converter 27 is connected to a machine control unit 28 for controlling the machine 15.

The drive 20 further includes a device 29 for excitation control, arranged between the machine 15 and the control unit 22. The drive 20 further preferably includes one or more sinus filters 30, which, for example, are arranged between the AC/DC converter 25 and switch 21, and between the machine 15 and DC/AC converter 27.

In connection with the Active Front End control 26 it is arranged a circuit 32 for reading voltage and phase angle for the switchboard 40.

The function of the different components will appear from the further description below.

The drive 20 and its components are preferable arranged in a frequency converter cabinet in one or more sections.

By that the hybrid shaft generator drive 20 includes a static frequency converter 25 with Active Front End control 26 4-quadrant operation of the electrical machine 15 is possible, which machine 15 can power a propeller shaft with variable speed against the switchboard 40 with fixed voltage and frequency in parallel with other generators 50a-b or as an island unit, and power the main propeller 12 together with the auxiliary generator set(s) 50a-b or together with the main engine 11.

This provides the following basic available modes for a vessel provided with a hybrid propulsion system according to the invention:

1. Electrical power take in: The propulsion system is supplied with power from the auxiliary generator set(s) 50a-b and is powering the main propeller 12 via the electrical machine 15 connected to the gearbox 13, while the main engine 11 is disconnected.

2. Hybrid power take in: The propulsion system is supplied with power from the auxiliary generator set(s) 50a-b and is powering the main propeller 12 via the electrical machine 15 connected to the gearbox 13. I.e. that the hybrid shaft generator drive 20 and main engine 11 are powering the main propeller 12 via the common gearbox 13.

3. Power take out to grid: The main engine 11 is powering the main propeller 12 with variable speed depending on requested output power. The hybrid shaft generator drive 20 is now using the electrical machine 15 connected to the gearbox 13 as a generator for supplying power to the switchboard 40/grid. The hybrid shaft generator drive 20 is here operated in parallel with the auxiliary generator set(s) 50a-b.

4. Power take out as an island unit: The main engine 11 is powering the main propeller 12 with variable speed depending on requested output power. The hybrid shaft generator drive 20 is now using the electrical machine 15 connected to the gearbox 13 as a generator for supplying the switchboard 40/grid. The hybrid shaft generator drive 20 is supplying fixed voltage and frequency to the switchboard 40/grid as an island unit without the auxiliary generator set(s) 50a-b in parallel.

The above mentioned modes are arranged in the control unit 22, which controls the mentioned modes from mode selected by the operator of the vessel via the propeller control system 110. The propeller control system 110 preferably includes a separate mode for pure mechanical operation, which means that only the main engine 11 is used.

Electrical power take in can be performed when the vessel is operated as a diesel electric propulsion system, where the auxiliary generator set(s) 50a-b is/are powering the propulsion system and switchboard 40/grid. The hybrid shaft generator drive 20 is connected to the switchboard 40 and is supplied by the auxiliary generator set(s) 50a-b. The main engine 11 is stopped and clutched out, while the electrical machine 15 is clutched in and operates as a motor which powers the main propeller 12. The control mode in the AFE control 26 is AFE mode. In AFE mode the AC/DC converter 25 is synchronized with the voltage of the switchboard 40, controlling the current direction and amplitude based on the DC-level in the DC-intermediate circuit 31. The converter 25 is further utilizing the sinus filter 30 to draw a sinusoidal current from the auxiliary generator set(s) 50a-b to avoid harmonic distortion on the grid. The converter 25 with Active Front End control 26 is operating towards a fixed DC voltage set in the DC-intermediate circuit 31, and the power direction is controlled based on that level The converter 27 with the machine control unit 28 is using the DC voltage from the DC-intermediate circuit 31, read by the converter 27, and is operating the machine 15 in speed or power control depending on input from the propeller control system 110, which can be selected by the operator of the vessel from the bridge.

Hybrid power take in can be performed when the vessel is operated by using both main engine 11 and electrical propulsion and is then capable of delivering maximal propulsion power. The auxiliary generator set(s) 50a-b is/are supplying the switchboard 40, while the hybrid shaft generator drive 20 is connected to the switchboard 40 and is supplied by the auxiliary generator set(s) 50a-b. The main engine 11 is running and is clutched in, while the electrical machine 15 is clutched in and operating as a motor and is powering the main propeller 12 together with the main engine 11. The control mode in the AFE control 26 is also here AFE mode. In AFE mode the AC/DC, converter 25 is synchronized with the voltage of the switchboard 40, controlling current direction and amplitude based on the DC voltage level in the DC-intermediate circuit 31, read by the AC/DC converter 27. The sinus filter 30 is utilized for drawing a sinusoidal current from the auxiliary generator set(s) 50a-b to avoid harmonic distortion on the grid. The converter 25 with AFE control 26 is working towards a fixed DC voltage set in the DC-intermediate circuit 31 and the power direction is controlled based on that level. In the converter 27 with the machine control unit 28 the DC voltage from the DC-intermediate circuit 31 is used and operates the electrical machine 15 in hybrid power control.

Power take out to grid is performed when the vessel is operated by the use of the main engine 11 and auxiliary generator set(s) 50a-b, where the main engine 11 supplies the switchboard 40 with power. The auxiliary generator set(s) 50a-b supplies the switchboard 40 in parallel with the hybrid shaft generator drive 20. The main engine 11 is running and is clutched in, while the electrical machine 15 is clutched in and operates as a generator. The main engine 11 is powering the main propeller 12 and the hybrid shaft generator drive 20. The control mode in the AFE control 26 is grid mode. In grid mode the AC/DC converter 25 with AFE control 26 is supplied from the DC voltage in the DC-intermediate circuit 31. Further, the sinus filter 30 is utilized to deliver a sinusoidal voltage to the switchboard 40. The converter 25 with AFE control 26 has i grid mode a frequency drop for power load sharing with the auxiliary generator set(s) 50a-b and a voltage drop for reactive load sharing with the auxiliary generator set(s) 50a-b. The output frequency set point is adjustable based on input from a power management system 100 or synchronizer. Frequency drop in the auxiliary generator set(s) 50a-b and the hybrid shaft generator drive 20 will balance the active load and the power management system 100 can change frequency set point to compensate for change in frequency drop to achieve desired switchboard 40 frequency, and balance the load on the auxiliary generator set(s) 50a-b and the hybrid shaft generator drive 20, if required. The electrical machine 15 is clutched in and is powered by the main engine 11, and the converter 27 with the machine control unit 28 of the hybrid shaft generator drive 20 is magnetizing the machine 15 and the speed reference is set to zero. The amount of braking torque which is applied to a shaft between the electrical machine 15 and the gearbox 13 is controlled by an overvoltage controller in the machine control unit 28, which overvoltage controller is monitoring the DC voltage in the DC-intermediate circuit 31, read by the converter 27 in the hybrid shaft generator drive 20. If the load on the switchboard 40 changes, the DC voltage in the DC-intermediate circuit 31 will change and the machine control unit 28 will change the motor braking torque limit to compensate for the change in DC voltage. If the rpm of the main engine 11 changes, the braking power from the electrical machine 15 will change, this will change the DC level in the DC-intermediate circuit 31. The machine control unit 28 will then change the motor braking torque limit to compensate for the change in DC voltage.

Power take out as an island unit is performed when the vessel is operated by the use of the main engine 11, where the main engine 11 is powering the switchboard 40. The hybrid shaft generator drive 20 is supplying the switchboard 40. The main engine 11 is running and clutched in, while the electrical machine 15 is clutched in and is operates as a generator. The main engine 11 is powering the main propeller 12 and the hybrid shaft generator drive 20. The control mode in the AFE control 26 is island mode. In island mode the DC/AC converter 25 is supplied with DC voltage from the DC-intermediate circuit 31. The sinus filter 30 is utilized to deliver a sinusoidal voltage to the switchboard 40. The AFE control 26 has in island mode a fixed output voltage and frequency. The output frequency set point is adjustable based on input from the power management system 100 or a synchronizer. The electrical machine 15 clutched in and is powered by the main engine 11, where the machine control unit 28 in the hybrid shaft generator drive 20 is magnetizing the electrical machine 15 and the speed reference is set to zero. The amount of braking torque applied to a shaft between the machine 15 and the gearbox 13 is controlled by the overvoltage controller in the machine control unit 28 which is monitoring the DC voltage in the DC-intermediate circuit 31 by means of the converter 27. If the load of the switchboard 40 changes, the DC voltage in the DC-intermediate circuit 31 will change and the machine control unit 28 will change the motor braking torque limit to compensate for the change in the DC voltage. If the rpm of the main engine 11 changes, the braking power from the electrical machine will change, this will change the DC level in the DC-intermediate circuit 31. The machine control unit 28 will then change the motor braking torque limit to compensate for the change in DC voltage.

When a new operation mode for the vessel is selected by the vessel operator, the control unit 22 in the hybrid shaft generator drive 20 gets a command from the propeller control system to go to selected mode, or to start up in a certain mode. Before changing mode or starting up the power management system 100 and propeller control system 110 must confirm that all conditions are meet. The control unit 22 will then change the control algorithm in the AFE control 26 and machine control unit 28 to meet the selected control mode. The control unit 22 will also check that all interlocks is as they should, control main switch(es) and synchronize the AFE control to the auxiliary generator set(s) 50*a-b*, if required.

Since the hybrid shaft generator drive 20 has a circuit 32 for reading phase angle and voltage of the switchboard 40, it can rapidly adapt the frequency and phase angle of the switchboard 40, which makes safe and rapid synchronization to the switchboard 40 possible. The control unit 22 will also control and adjust current limits, force/power limits and generator limits based on input from the power management system 100 and main engine speed.

The control unit 22 also controls mode change procedures, such as synchronizing the rpm of the electrical machine 15 to the main engine 11 before clutching in, power/force and ramping torque up/down to smoothen the mode changes.

For the system to work as described a special design of the switchboard 40 is requested, and the system must be provided with a protection system for ensuring selectivity on the switchboard 40 to avoid overload. As the hybrid shaft generator drive 20 is not capable of delivering the same amount of short circuit current a standard generator, special precautions have to be taken when it comes to design of the switchboard 40. The hybrid shaft generator drive 20 has current limit function in the modes power take out as island unit and power take out to grid. If the current limit is reached the AFE control 26 is keeping the frequency, but adjusting output voltage to ensure that the current limit is not exceeded, which is illustrated in FIG. 2. FIG. 2 shows a short circuit test of the hybrid shaft generator drive 20, where the current limit is set to 200 A, output voltage to 400 V with a frequency of 50 Hz and a frequency drop of 2%. An electrical protection relay between the hybrid shaft generator drive 20 and the short circuit had a delay of 200 ms. As the simulation shows the frequency is stable with a frequency drop of 1 Hz, while the output current is stable at the limit for 200 A and the output current drops as the hybrid shaft generator drive 20 is short circuiting.

This means that if there is a short circuit near the hybrid shaft generator drive 20 having low impedance, the switchboard 40 voltage can go almost to zero. To ensure selectivity in the electrical system on all outgoing feeders and the distribution which have a short circuit level above or near the current limit of the hybrid shaft generator drive 20, electrical protection relays must be arranged at suitable positions, i.e., for example, in connection with switches 42 for consumers 41. This ensures selectivity in the system and the selectivity can be achieved by using time instead of current as trigger. Basically system design philosophy is that the further down in the distribution system one gets, the shorter is the time delay for switch disconnection. The same policy also applies for time delays of under voltage releaser devices on switches equipped with under voltage releasers. I.e. the further down in the distribution system, the shorter time delay for under voltage releaser in switches.

Also consumers with high starting current or inrush current as motors and large transformers must have special starters or pre-charging devices to avoid that the inrush current exceeds the current limit of the hybrid shaft generator drive 20, when operating in the power take out to grid or power take out as an island unit modes. This to avoid voltage drop and unnecessary over dimensioning of the drive 20.

The hybrid shaft generator drive 20 also has a powering limit function in the power take out to grid and power take out as island unit modes, so that if the power limit is reached, the AFE control 26 reduces the frequency and voltage according to a linear voltage/frequency in order to not exceed the given power limit. By reducing frequency and voltage one will reduce the power consumption on the switchboard 40, and it is then natural to reduce the frequency and voltage linearly, i.e. if the frequency is 80%, the voltage is 80% to not damage inductive loads, and that secondary loads without under voltage releasers will fall out, if the system becomes overloaded.

Rating and overload capabilities of the hybrid shaft generator drive 20 is given by the demands from the grid it supplies, and a normal over current rating will, for example, be 120% of nominal current.

The hybrid shaft generator drive 20 can use permanent magnet motors, asynchronous motors or brushless synchronous motors in closed loop motor control. This can, for example, be a standard brushless generator with small modifications as a brushless synchronous motor. Permanent magnet motor is recommended due to high starting torque (100%) and self-excitation. Current rating for the DC/AC converter 27 has to be calculated based on nominal current for the machine 15. A brushless synchronous machine is self-excitation, but has only limited starting torque (15-20%) and will also need an excitation control 29 in the hybrid shaft generator drive 20.

Current rating for the DC/AC converter 27 has to be calculated with a power factor which ensures regulator margin for external excitation.

When it comes to power, torque and speed in power take out to grid and power take out as island unit, the speed range for the main engine 11 in power take out mode is normally from 30-120% of nominal speed, where the amount of power the hybrid shaft generator drive 20 can deliver to the switchboard 40 is basically linear to the speed of the main engine 11 in relation to nominal speed, but is limited to 100%. The hybrid shaft generator drive 20 can deliver fixed voltage and frequency in the whole normal speed range of the main engine 11.

Asynchronous and permanent magnet motors are capable of delivering 100% braking torque in a range from 0-100% speed with the hybrid shaft generator drive 20, while brushless synchronous motors are capable of deliver 100% braking torque from 30-100% speed with the hybrid shaft generator drive 20.

As regards power, torque and speed in electrical power take in and hybrid power take in, the speed and operation range with asynchronous and permanent magnet motor is from 0-120% of nominal speed with the hybrid shaft generator drive 20, while using an asynchronous or permanent magnet motor will give 100% torque in the whole speed range, except an field weakening area with the hybrid shaft generator drive 20. The power capability is linear to output speed since the hybrid shaft generator drive 20 is capable of delivering 100% torque in the speed range. The speed and operation range for a brushless synchronous machine is from 30-120% of nominal speed with the hybrid shaft generator drive 20.

Using a brushless synchronous machine will give 100% torque in the whole speed operation range (30-100% speed), except for the field weakening area. Power capability is linear to output speed since the hybrid shaft generator drive 20 is capable of delivering 100% torque in the speed operating range, where the starting torque and torque capability up to 25% of speed is limited to 15-20% torque.

Special considerations must also be made with regard to the design of the frequency converter cabinet of the hybrid shaft generator drive 20. The cabinet can be based on a cabinet with normal Rolls Royce Marine AFE standard, but if a sinus filter on the output is required due to electrical motor construction or electromagnetic compatibility/acoustic noise demands, an extra cabinet section is added for this filter. If a brushless synchronous machine is used as electrical machine 15 there will be arranged an additional excitation control 29 in the cabinet.

Current rating can be done by standard AFE operation based on dimension specifications mentioned above.

Note that if there are special starting current demands, reactive load capabilities or minimum short circuit demands that are bigger than normal power calculation/current dimensioning of the hybrid shaft generator drive 20, these demands will be the dimension criteria.

The AFE control 26 is further provided with software/algorithms for normal AFE operation, but is modified to support the different modes and mode changing in the hybrid shaft generator drive 20, as described above and excitation control of the synchronous machine.

The hybrid shaft generator drive 20 is preferably also provided with a special interface diagram supporting additional functions compared to a standard AFE interface. Additional functions are typically communication between the control unit 22 and power management system 100 for acquiring information of power limits, and which mode being active. Other communication is communication between the control unit 22 and switchboard 40 about the number of generators being connected to the switchboard 40, synchronization and control of switches 21 of the drive 20, and changes of settings for protection.

It will also be additional functions between the control unit 22 and propeller control system 110 for mode selection and mode status.

Reference is now made to FIG. 3 which shows a principle drawing of a second embodiment of a hybrid propulsion system according to the invention. A second embodiment according to the invention includes the same as the first embodiment for performing the basic modes, i.e.:

1. electrical power take in,
2. hybrid power take in,
3. power take out to grid,
4. power take out as island unit, but is in addition arranged for one or more of the following modes:

5. full hybrid operation,
6. shore power mode, and
7. pure mechanical operation.

The mode for full hybrid operation includes that the hybrid shaft generator drive 20 has energy available from an energy storage 60, such as batteries, and is operated as a full hybrid by stepless use of the modes 1 to 4, depending of bridge command.

This means for the electrical power take in mode that the main propeller 12 is powered by the auxiliary generator set(s) 50*a-b*, via the electrical machine 15 connected to the gearbox 13, while the main engine 11 is disconnected. The energy storage 60 will, depending on the load level of the auxiliary generator set(s) 50*a-b*, be charged or supply the electrical machine 15 with power.

For the hybrid power take out mode this means that the main propeller 12 is powered by that both the electrical machine 15 and the main engine 11 are connected to the gearbox 13, where the auxiliary generator set(s) 50*a-b* are powering the electrical machine 15. The energy storage 60 will, depending on the load level of the auxiliary generator set(s) 50*a-b*, be charged or supplying the electrical machine 15 with power.

In the power take out to grid mode this means that the main engine 11 and the electrical machine 15 are connected to the gearbox 13, where the main engine 11 is powering the main propeller 12 with variable speed depending of required output power, while the electrical machine 15 is operated as a generator in parallel with the auxiliary generator set(s) 50*a-b* for supplying power to the switchboard 40. The energy storage 60 will, depending on the load level of the auxiliary generator set(s) 50*a-b*, be charged or supplying the switchboard 40 with power.

For the power take out as island unit mode this means that the main engine 11 and the electrical machine 15 is connected to the gearbox 13, where the main engine 11 is powering the main propeller 12 with variable speed depending on required output power, while the electrical machine 15 is operated as a generator for supplying fixed voltage and frequency to the switchboard 40. The energy storage 60 will, depending on the load level of the main engine 11, be charged or supplying the switchboard 40 with power.

The shore power mode includes that the hybrid shaft generator drive 20 is supplied with power from a shore connection 61 or energy storage 60, such as batteries, and supplying the switchboard 40 when the vessel lies at port. The hybrid shaft generator drive 20 will adapt the shore power frequency, phase sequence and voltage to the switchboard 40 of the vessel. The hybrid shaft generator drive 20 also makes it possible to run shore power in parallel with the auxiliary generator set(s) 50*a-b*. This mode may also be used if the vessel is supplied with power from other fixed installations, such as platforms or other maritime vessels when the vessel is fixed anchored. If power is available from the shore power connection 61 this can be used for charging the energy storage 60 via a charge control unit 63.

The mode for pure mechanical operation includes that the hybrid shaft generator drive 20 is disconnected and the main engine 11 is powering the main propeller 12 and the auxiliary generator set(s) 50*a-b* are supplying the switchboard.

For performing the additional modes this means that the hybrid shaft generator drive 20 according to the invention includes an energy storage 60, a shore power connection 61, a device 62 for reading voltage and rectifying of shore power to the properties of the hybrid shaft generator drive 20, and a charge control unit 63 for controlling shore power and monitoring of the power reserve. The charge control unit 63 is controlled by the control unit 22, which based on bridge command and available power on the switchboard 40, determines if the energy storage is to be discharged or charged.

Modifications

For increasing redundancy in the system according to the invention more than one AC/DC frequency converter 25 may be used.

On a vessel having more than one main propeller 12 it will be natural to utilize one hybrid shaft generator drive 20 for each main propeller 12, as these can supply separate switchboards 40, and possibly be operated in parallel.

The DC-intermediate circuit 31 can, when the vessel lies at port, be supplied with shore power so that one does not need to take phase sequence and frequency into consideration when phasing in shore power.

The DC-intermediate circuit 31 can be provided with an energy storage possibility for optimizing mode change and possibly supply the switchboard 40 from an energy storage when the load is low, for example at port.

All switches described above can consist of several switches arranged in parallel or series to ensure redundancy, so that if one switch fails, full safety of the system is still achieved.

The system can include several frequency converters in parallel for increased safety, so that one frequency converter can take over for another if an error arises at this.

The system according to the invention can also be utilized as a standalone unit without being operated in relation to one or more auxiliary generator sets. Electrical machines can then be powered by the energy storage, and that the system can operate as a shore power unit which makes it possible to supply the vessel with correct voltage and frequency from shore, and cooperating shore power with the auxiliary generator sets of the vessel.

The system can further be arranged to operate as an energy storage unit for smoothening the load of the auxiliary generator sets, i.e. if there is a lack of power onboard, it will supply the vessel from the energy storage, and when it is surplus power it will store energy in the energy storage. This will be the case when the vessel, for example, is performing a DP operation where there are large energy variations, or electrical machines, for example, are connected to a winch/crane, which generates a lot of reverse power which the switchboard normally is no able to receive.

The invention claimed is:

1. Hybrid propulsion system for a vessel, comprising:
   one or more auxiliary generator sets (50a-b), which auxiliary generator sets (50a-b) includes a motor (51a-b) configured to power an electrical generator (52a-b), which auxiliary generator sets (50a-b) are arranged to one or more switchboards (40)/grid via switches (53a-b),
   one or more propulsion means (12) for the vessel,
   one or more main engines (11) for powering the propulsion means (12),
   one or more transmission devices (13),
   wherein the main engine(s) (11) is/are connected to the propulsion means (12) via the transmission device(s) (13), and that there is arranged a connection device (14) between the transmission device (13) and the main engine (11) for connecting and disconnecting of the main engine (11),
   wherein one or more electrical machines (15) is/are arranged to the transmission device(s) (13) via a connection device (16) for connecting and disconnecting of the electrical machine (15) to the transmission device(s) (13), and
   wherein the system further includes:
   one or more hybrid shaft generator drives (20), which is/are arranged between the electrical machine (15) and one or more switchboards (40) of the vessel, which hybrid shaft generator drive (20) includes one or more static frequency converters, in the form of bidirectional frequency converters (25) with Active Front End control (26), which frequency converter(s) (25) is/are arranged with parameters so that it has the same electrical characteristics as a generator set;
   wherein the hybrid shaft generator drive (20) is arranged for powering the propulsion means (12), via the electrical machine (15), with variable rotational speed against the switchboard (40) with fixed voltage and frequency;
   wherein the electrical machine (15) is a permanent magnet motor that can be operated both as a generator and motor when the main motor is running with a variable rotational speed; and
   wherein the hybrid shaft generator drive (20) is configured to balance the active load between the auxiliary generator set(s) (50a-b) and the hybrid shaft generator drive (20);
   wherein the active load is balanced by one or more of the following:
   a) arranging the hybrid shaft generator drive (20) to compensate the output voltage based on reactive current out from the hybrid shaft generator drive (20) for achieving a desired reactive load distribution on the switchboard (40),
   b) arranging the hybrid shaft generator drive (20) to compensate for changes in frequency drop to achieve desired frequency for the switchboard (40), and
   c) arranging the hybrid shaft generator drive (20) to change the amount of braking torque applied to a shaft between the electrical machine (15) and the gearbox (13) for compensating for the change in the DC voltage.

2. Hybrid propulsion system according to claim 1, wherein the hybrid shaft generator drive (20) includes a switch (21) for connection to the switchboard (40).

3. Hybrid propulsion system according to claim 1, wherein the hybrid shaft generator drive (20) includes a control unit (22) arranged to/provided with an interface to a power management system (100) and an interface to a control system (110) for controlling the propulsion means (12).

4. Hybrid propulsion system according to claim 1, wherein the hybrid shaft generator drive (20) includes a pre-charging circuit (24) for pre-charging a DC-intermediate circuit (31).

5. Hybrid propulsion system according to claim 1, wherein the hybrid shaft generator drive (20) includes a bidirectional frequency converter (27) connected to the electrical machine (15) and controlled by a machine control unit (28).

6. Hybrid propulsion system according to claim 1, wherein the hybrid shaft generator drive (20) includes a device (29) for excitation control, arranged between the electrical machine (15) and the control unit (22).

7. Hybrid propulsion system according to claim 1, wherein the hybrid shaft generator drive (20) includes one or more sinus filters (30) for drawing a sinusoidal current to or from the auxiliary generator set(s) (50a-b) for avoiding harmonic distortion on the grid, and for delivering a sinusoidal voltage to the switchboard (40).

8. Hybrid propulsion system according to claim 7, wherein a sinus filter (30) is arranged:
   between the frequency converter (25) with Active Front End control (26) and the switchboard (40), and/or
   between the electrical machine (15) and the frequency converter (27).

9. Hybrid propulsion system according to claim 1, wherein the hybrid shaft generator drive (20) is arranged for 4-quadrant operation of the electrical machine (15).

10. Hybrid propulsion system according to claim 9, wherein the hybrid shaft generator drive (20) is arranged for powering the propulsion means (12) in parallel with the auxiliary generator set(s) (50a-b), or as an island unit, and powering the propulsion means (12), via the electrical machine (15), together with the auxiliary generator set(s) (50a-b), or together with the main engine(s) (11).

11. Hybrid propulsion system according to claim 1, wherein the hybrid shaft generator drive (20) includes a circuit (32) for reading voltage and phase angle for the switchboard (40), arranged in connection with the AFE control (26).

12. Hybrid propulsion system according to claim 1, wherein the switchboard(s) (40) is/are arranged for controlling the supply to other consumer units (41) onboard, via switches (42).

13. Hybrid propulsion system according to claim 3, wherein the control unit (22) is provided with algorithms/software and/or means for controlling the hybrid shaft generator drive (20).

14. Hybrid propulsion system according to claim 1, wherein when the electrical machine (15) is operated as a motor, the main engine(s) (11) and propulsion means (12) can be operated with variable speed, while the grid is stable and fixed, and that the electrical machine (15) can be operated either alone or together with the main engine(s) (11).

15. Hybrid propulsion system according to claim 1, wherein, when the electrical machine (15) is operated as a generator, the machine can be operated alone or in parallel with other auxiliary generator sets (50a-b) without load sharing problems, even if the main engine(s) (11) and the propulsion means (12) are operated with variable speed.

16. Hybrid propulsion system according to claim 1, wherein the hybrid shaft generator drive (20) includes an energy storage (60), a connection for shore power (61), a unit (62) for adapting voltage, phase and current to the properties of the drive (20), and a charge control unit (63).

17. Hybrid propulsion system according to claim 1, wherein the control unit (22) is provided with algorithms/software for controlling the propulsion system, which control includes one or more of the following modes for operation of the vessel:
  1. Electrical power take in, which includes that the propulsion means (12) are powered by the auxiliary generator set(s) (50a-b), via the electrical machine (15) connected to the gearbox (13), while the main engine(s) (11) is/are disconnected;
  2. Hybrid power take in, which includes that the propulsion means (12) are powered by that both the electrical machine (15) and main engine(s) (11) are connected to the gearbox (13), where the auxiliary generator set(s) (50a-b) are powering the electrical machine (15);
  3. Power take out to grid, which includes that both the main engine(s) (11) and the electrical machine (15) are connected to the gearbox (13), where the main engine(s) (11) is/are powering the propulsion means (12) with variable speed depending on required output power, while the electrical machine (15) is operated as a generator in parallel with the auxiliary generator set(s) (50a-b) for supplying power to the switchboard (40);
  4. Power take out as island unit, which includes that both the main engine(s) (11) and the electrical machine (15) are connected to the gearbox (13), where the main engine(s) (11) is/are powering the propulsion means (12) with variable speed depending on required output power, while the electrical machine (15) is operated as a generator for supplying fixed voltage and frequency to the switchboard (40), and that the auxiliary generator set(s) (50a-b) is/are disconnected.

18. Hybrid propulsion system according to claim 17, wherein the control unit (22) further includes a mode for full hybrid operation, which includes stepless change of the modes 1-4, where the energy storage (60), depending on the load level of the auxiliary generator set(s) (50a-b), in the electrical power take in and hybrid power take in modes, is charged or supplying the electrical machine (15) with power, and in the power take out to grid and power take out as island unit modes, is charged or supplying power to the switchboard (40), which results in more rapid and simple mode changes.

19. Hybrid propulsion system according to claim 17, wherein the control unit (22) further includes a shore power mode, which includes that the hybrid shaft generator drive (20) is supplied with power from a shore connection (61) or energy storage (60) and is supplying power to the switchboard (40), where the hybrid shaft generator drive (20) is arranged for adapting the shore power frequency, phase sequence and voltage to the switchboard (40).

20. Hybrid propulsion system according to claim 19, wherein the hybrid shaft generator drive (20) is arranged for running shore power in parallel with operation of the auxiliary generator set(s) (50a-b).

21. Hybrid propulsion system according to claim 16, wherein the shore connection (61) is used for charging the energy storage (60) via the charge control unit (63).

22. Hybrid propulsion system according to claim 1, wherein the control unit (22) further includes a mode for pure mechanical operation or that the propeller control system (110) includes a separate mode for pure mechanical propulsion, which includes that the main engine(s) (11) is/are connected to the gearbox (13) and powering the propulsion means (12), and the auxiliary generator set(s) (50a-b) is/are supplying power to the switchboard (40), while the electrical machine (15) is disconnected from the gearbox (13).

23. Hybrid propulsion system according to claim 17, wherein the balancing of the load is achieved in that the hybrid shaft generator drive (20) is arranged for reading the DC voltage in the DC-intermediate circuit (31), which read DC voltage is an expression for the change of the load of the switchboard (40), or the rpm of the main engine (11).

24. Hybrid propulsion system according to claim 1, wherein the hybrid shaft generator drive (20) is arranged for ensuring safe selectivity on the switchboard (40) in that it includes a current limit function in the modes power take out as island unit and power take out to grid, where the AFE control (26), if a current limit is reached, is arranged to keep the frequency, but adjusting the output voltage to ensure that the current limit is not exceeded.

25. Hybrid propulsion system according to claim 1, wherein the hybrid shaft generator drive (20) is arranged for preventing overload of the hybrid shaft generator drive (20) and main engine (11) in that it includes a powering limit function in the modes power take out as island unit and power take out to grid, where the AFE control (26), if a power limit is reached, is arranged to reduce the frequency and output voltage to ensure that the power limit is not exceeded.

26. Hybrid propulsion system according to claim 1, wherein the system includes protection devices on all outgoing feeders, such as the consumer units (41), for time-controlled disconnection at under voltage to ensure safe disconnection at error and full system restoration on the switchboard (40).

27. Hybrid propulsion system according to claim 1, wherein the DC-intermediate circuit (31) is provided with an energy storage possibility for optimizing mode change and possibly supplying the switchboard (40) from the energy storage (60) when the load is low.

28. Hybrid propulsion system according to claim 1, wherein the control unit (22) is arranged for controlling and adjusting current limits, force/power limits and generator limits based on input from the power management system (100) and main engine speed, and controlling synchronization of the rpm of the electrical machine (15) to the main engine(s) (11) before connecting, and power/force and ramping of torque up/down for smoothening mode changes.

29. Hybrid propulsion system according to claim 1, wherein the control unit (22) is arranged for adjusting the output frequency and voltage to the switchboard (40) so that the power management system (110) can compensate for frequency drop when the hybrid shaft generator drive (20) is operated in the power take out to grid mode, to be able to distribute load with other generator sets.

30. Hybrid propulsion system according to claim 1, wherein the consumer units (41) with high starting current or inrush current are provided with special starters or pre-charge devices, to avoid the inrush current from exceeding the current limit of the hybrid shaft generator drive (24) at operation in the power take out to grid and power take out as island unit modes.

31. Hybrid propulsion system according to claim 1, wherein the hybrid shaft generator drive (20) is provided with a power limit function in the power take out to grid and power take out as island unit modes, so that if the power limit is reached the AFE control (26) is reducing the frequency and voltage according to a linear voltage/frequency to not exceed the given power limit.

32. Hybrid propulsion system according to claim 1, wherein the system includes a protection topology for ensuring selectivity of the switchboard (40) at short circuiting, which includes differentiated time-controlled protection relays on outgoing distribution feeders, such as the consumer units (41), with a current level adapted the current limit of the frequency converter (25).

33. Hybrid propulsion system according to claim 1, wherein the system is utilized as a standalone unit without being operated in connection with one or more auxiliary generator sets (50*a-b*), where electrical machines (15) are powered by the energy storage (60), and that the system can operate as a shore power unit which makes it possible to supply the vessel with correct voltage and frequency from the shore connection (61), and cooperating shore power with the auxiliary generator sets (50*a-b*) of the vessel.

34. Hybrid propulsion system according to claim 1, wherein the system further is arranged to operate as an energy storage unit for smoothening the load on the auxiliary generator sets (50*a-b*), which includes that if there is a lack of energy onboard it will supply the vessel with power from the energy storage (60), and when it is surplus of power it will store power in the energy storage (60).

* * * * *